United States Patent [19]
Carnes et al.

[11] Patent Number: 5,770,832
[45] Date of Patent: Jun. 23, 1998

[54] METHOD FOR DETERMINING AND CONTROLLING THE COOLING RATE FOR METAL ALLOYS IN AN ELECTRICAL RESISTANCE WELDING PROCESS

[75] Inventors: Robert W. Carnes; Michael W. Harville, both of Austin; Paul W. Haase, Corpus Christi, all of Tex.

[73] Assignee: Board of Regents, The University of Texas System, Austin, Tex.

[21] Appl. No.: 602,215

[22] Filed: Feb. 15, 1996

Related U.S. Application Data

[63] Continuation-in-part of Ser. No. 389,884, Feb. 15, 1995, abandoned.

[51] Int. Cl.[6] .................................................. B23K 11/02
[52] U.S. Cl. ........................... 219/109; 219/104; 219/112
[58] Field of Search .................................... 219/112, 101, 219/102, 104, 109, 110

[56] References Cited

U.S. PATENT DOCUMENTS 2,834,871  5/1958  Berg .
4,296,305  10/1981  Lifshits et al. .
4,656,328  4/1987  Weldon et al. .

OTHER PUBLICATIONS

Grant et al., "Homopolar Pulse Resistance Welding–A New Welding Process", Welding Journal, pp. 24–36, May 1979.

*Primary Examiner*—Clifford C. Shaw
*Attorney, Agent, or Firm*—Arnold, White & Durkee

[57] ABSTRACT

The system of the present invention includes a homopolar generator, a hydraulic uniaxial press to hold the metal alloys to be welded, and electrical connections set at selected distances from the weld interface to provide a desired cooling rate for metal alloys being welded. A method is disclosed for determining a cooling rate for a metal alloy pipe in an electrical resistance welding process in a homopolar welding system following the resistive heating of a weld interface by discharging energy from a homopolar generator through electrodes attached to each of first and second pipes to form a welded pipe segment. The temperature of the welded pipe segment is measured at periodic time intervals to determine a cooling rate for the welded pipe segment. A desired range for the cooling rate may be determined by adjusting the electrode gap for repeated samples and analyzing the resulting metallurgical properties for each sample. In a further aspect, a method is disclosed for controlling the cooling rate of metal alloy pipe by varying the electrode gap to provide a desired cooling rate following resistive heating of the weld interface and allowing the welded pipe segment to cool at the desired cooling rate.

18 Claims, 9 Drawing Sheets

METHOD FOR DETERMINING AND CONTROLLING THE COOLING RATE FOR METAL ALLOYS IN AN ELECTRICAL RESISTANCE WELDING PROCESS

The present application is a continuation-in-part of U.S. patent application Ser. No. 08/389,884, filed Feb. 15, 1995 now abandoned. The entire text of the above-referenced disclosure is specifically incorporated by reference herein without disclaimer.

BACKGROUND OF THE INVENTION

1. Field of the Invention

The present invention relates generally to the fields of welding and welding processes.

More particularly, it concerns methods for determining and controlling the cooling rate for metal alloys in electrical resistance welding processes.

2. Description of the Related Art

Homopolar pulse welding (HPW) utilizes a high current, low voltage pulse produced by a homopolar generator to rapidly resistance heat the interface between two components to forging temperature. An upset force is then applied to produce a forge weld at the interface. Only a few seconds is required from initiation of the pulse to completion of the weld. HPW is being investigated as a means to rapidly join lengths of pipe in pipeline construction. It is particularly attractive for application in deep water offshore pipeline construction systems including the J-lay system. Early HPW welds in API 5L X-52 carbon steel linepipe have exhibited full tensile strength but unacceptably low impact toughness.

While homopolar welding has great potential as a welding process in pipelaying, suitable mechanical properties must be reliably and repeatedly achievable in the weld zone. Previous research has shown homopolar welding of API pipeline steels to be lacking in this, particularly in achieving acceptable impact toughness. In that regard it is an objective of the present invention to address these problems.

The homopolar generator is based on the principle that a conductor moving normal to magnetic fields generates an electric potential difference between the conductor ends. In one type of such a generator, the conductor is a disk rotating normal to the direction of a magnetic field generated by field coils surrounding the disk. A potential difference is generated between the rotor outside diameter and the rotor shaft. Sliding contacts on the shaft and rotor serve as current collection devices. This "disk-type" of generator was employed in connection with the present invention.

An important consideration in any welding process is the structural integrity of the welded material following the welding process. This is generally determined by analyzing the metallurgical properties of test welds in and near the weld zone, and determining what pre- and post-weld parameters are necessary for achieving a weld with optimal parameters. These parameters necessarily depend on the particular use for the welded material.

SUMMARY OF THE INVENTION

The present invention results in part from an observation that the metallurgical properties of a weld are dependent upon the cooling rate of the metal being welded. The invention also results in part from a recognition that it would be of great benefit to control the metallurgy in the weld zone, and thereby the mechanical properties and the microstructural properties of the weld. The invention accomplishes this by varying the cooling rate without having to resort to time-consuming post-weld heat treatment. More particularly, the invention provides for a controlled cooling rate of metals and metal alloys that have been welded together using an electrical resistance welding process. Resistance welding, as used herein, means processes that discharge current through electrodes to resistively heat metal alloy work-pieces and weld them together. A resistance welding technique of particular interest in the present invention is the homopolar forge welding technique.

The present invention controls the cooling rate of two metal work-pieces in a homopolar pulse welding process by varying the distance between the electrodes attached to the work-pieces, and thereby the distances between the electrodes and the weld interface. The former distance is referred to as the electrode gap, and the latter distance as the electrode distance.

The postweld cooling rate is via thermal conduction, and is determined by the pipe and electrode physical dimensions, with the copper electrodes acting as a heat sink during cooling. The volume of material in the electrode distance heats resistively as the current passes through it, thereby creating a thermal barrier to rapid cooling of the weld interface. Thus, by increasing the electrode gap, the cooling rate of the weld zone (or heat affected zone) may be slowed; conversely, by reducing the electrode gap, the cooling rate of the weld interface may be increased.

Increasing the distance between the electrodes heats a larger bulk of the pipe on either side of the weld joint and increases the conduction path from the weld zone, slowing the cooling rate. The cooling rate for the weld interface in an electrical resistance welding process may therefore be controlled through manipulation of the electrode gap, and a desired cooling rate may be determined by analyzing the metallurgical properties of the heat affected zones (HAZ) created with varying electrode gaps. The weld zone is a narrow region (approximately 1 mm) at the place where the weld interface was prior to heating. The HAZ is a region (approximately 5 mm) to either side of the weld zone where the microstructure has been changed.

The metallurgical properties of a weld depend in large part upon the cooling rate of the metal material after it has been resistively heated and welded. Thus, these properties may be enhanced through the methods disclosed in the present invention. More particularly, the present invention enables control of the metallurgy in the weld zone, thereby controlling the mechanical properties of the weld. Further, post-weld heat-treatment may also be avoided, thereby improving total process speed.

The present invention in a general aspect provides a method and apparatus for controlling the pulse-weld cooling rate of metal alloy material. This cooling rate is dependent upon the electrode gap, which is measured by the distance from a first electrode to the weld interface plus the distance from a second electrode to the weld interface. In embodiments of the invention, the two electrodes may be positioned so that the weld interface is equidistant from each of the two electrodes. Variations on this placement, however, may be made without departing from the scope and spirit of the invention. The metal work-piece of the present invention may be pipe, although other conduit structures, such as square tubing or a flat plate, may also be welded. By adjusting the electrode gap, the cooling rate of the welded conduit segment between the electrodes may be controlled. For the purposes of this disclosure of the invention, the terms "pipe" may be considered to include other suitable forms of conduits, including tubing.

The desired range for the cooling rate or a desired cooling rate for any particular metal or metal alloy (e.g, nickel alloy, titanium alloy, steel alloy, metal matrix material, etc.) depends upon its elemental constituency and its ultimate purpose. The desired cooling rate for a particular material may be determined, therefore, by testing the material and investigating the resulting metallurgical properties of the weld interface for a variety of electrode gaps.

In one preferred general aspect, the system includes a homopolar generator, a hydraulic uniaxial press to hold the structures to be welded, electrical connections to the generator, which lead and are connected to electrodes set at selected distances from the weld interface to provide a desired cooling rate. In more detailed aspect, the present invention resides in a method for determining a cooling rate for a metal alloy pipe in an electrical resistance welding process in a homopolar welding system.

The method preferably includes first preparing the ends of a first pipe and a second pipe for electrical resistance welding in a homopolar welding system and contacting the end of the first pipe and the end of the second pipe to form a weld interface. Next, a first electrode is mounted on the first pipe and a second electrode is mounted on the second pipe, such that a distance between the first electrode and the second electrode defines an electrode gap. The weld interface is resistively heated by discharging energy from a homopolar generator through the first electrode and the second electrode to weld the first and second pipes at the weld interface, forming a welded pipe segment. The temperature of the welded pipe segment is measured at periodic time intervals to determine the cooling rate for the welded pipe segment.

A desired range for the cooling rate may be determined by adjusting the electrode gap for repeated samples and analyzing the resulting metallurgical properties for each sample. The desired cooling rate or range for the cooling rate may be thereby determined.

In another aspect, the present invention resides in a method for controlling the cooling rate of metal alloy pipe in an electrical resistance welding process in a homopolar welding system. The method preferably includes preparing the ends of a first pipe and a second pipe for electrical resistance welding in a homopolar welding system and contacting the end of the first pipe and the end of the second pipe to form a weld interface, First and second electrodes are mounted on the first and second pipes, respectively, such that the distance between the first electrode and the second electrode defines an electrode gap that is selected to provide to a desired cooling rate. The weld interface is resistively heated by discharging energy from a homopolar generator through the first electrode and the second electrode to weld the first and second pipes to form a welded pipe segment. Finally, the welded pipe segment is cooled at the desired cooling rate.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

Figure 1:
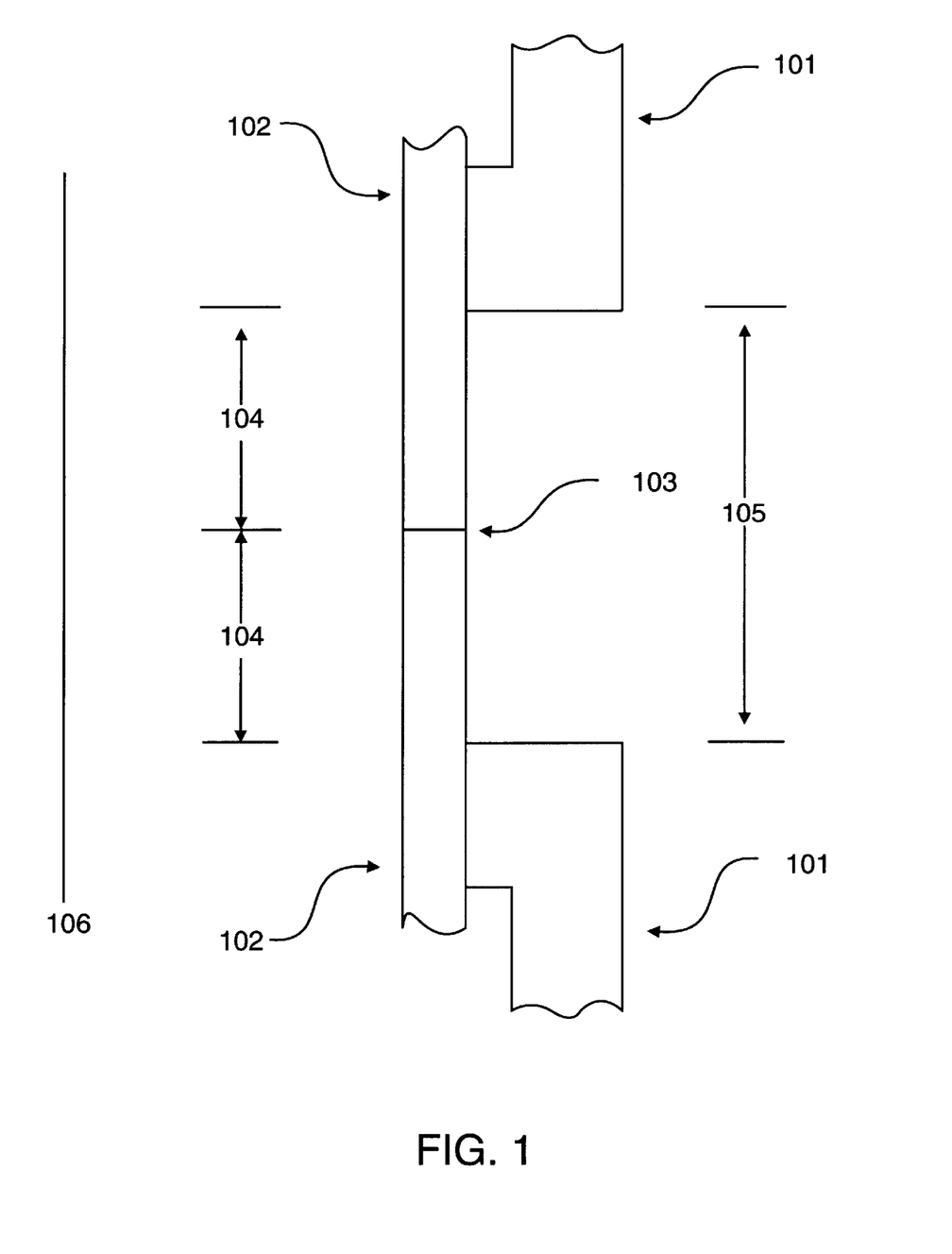
FIG. 1 is a schematic showing the electrode distance in electrical resistance welds.

FIG. 1 shows the variable electrode distances in an electrical resistance weld. As used herein, the distance between an electrical resistance weld interface 103 and each electrode 101 is called the electrode distance 104. The electrode gap 105 is defined as the sum of the distance measured from a first electrode to the weld interface plus the distance from a second electrode to the weld interface. A metal alloy work-piece 102 may be a pipe, although other structures, such as square tubes, are also contemplated within the scope of the present invention. By moving electrodes 101 along the centerline 106 of work-piece 102 and thereby adjusting the electrode gap, the cooling rate of the welded work-piece 102 may be regulated.

TRANSFORMATIONS THAT OCCUR UPON HEATING AND COOLING

Austenite Grain Growth

In arc welding of steel pipe, the main problem with increasing weld deposition rates is rapid growth of austenite in the heat affected zone, followed by slow cooling through the transformation range of about 920° C. Hardenability is controlled by chemistry and austenite grain size (Kirkwood, 1987). The ability to obtain homogeneous austenite grain refinement and avoid mixed-grain sizes is a key factor in obtaining high levels of toughness in controlled-rolled High Strength, Low Alloy (HSLA) steels (DiMicco and Davenport, 1982).

As used herein, a grain coarsening temperature for a metal alloy is a temperature above which undissolved precipitates can no longer suppress grain growth. For example, the grain coarsening temperature for aluminum and niobium steel alloys is about 1050°–1100° C., whereas vanadium steel alloy may coarsen at about 950° C.

Pearlite

At carbon levels in the range found in mild steels, changes in pearlite content have little effect on yield strength but serve to raise the impact transition temperature. In investigations of fully pearlitic steels, it was determined that refining the interlamellar spacing of pearlite increased the strength but decreased the impact toughness (Lagneborg el al., 1985). Transformation temperature controls pearlite interlamellar spacing, and is independent of prior austenite grain size.

Fracture toughness has, however, been found to strongly depend on austenite grain size, with pearlite colony size having little effect. Low temperature cleavage in pearlite follows the ferritic {100} planes, just as it does in ferrite. Reference is made to a review by Ridley (Ridley, 1983) for a more complete analysis of pearlite formation.

Bainite

Samuels (Samuels, 1980) defines bainite as a eutectoid transformation product consisting of ferrite and a fine dispersion of carbide formed generally at temperatures below 450°–500° C. There is a common distinction made between upper bainite formed at temperatures above 350° C. and lower bainite formed at lower temperatures.

In flash welding, it has been observed that as carbon content of steel decreases, the proportion of bainite in the coarse grain zone also decreases. Bainitic phase steels tend to produce a continuous stress-strain relationship in tensile testing, and upper bainite may have very low impact toughness (Fairchild, 1987), which is less than lower bainite at comparable strength levels (Irvine and Pickering, 1963). The largest dimension of a ferrite plate in bainite may approximate the prior austenite grain diameter, and an effective way to improve impact properties of bainite is to reduce the prior austenite grain size.

In continuous cooling applications, such as found in welding, it has been observed in microalloyed C—Mn steels that the lath structure of bainite coarsens with decreasing cooling rate, along with greater amounts of proeutectoid ferrite being present (Faulkner, 1989). Thaulow, et al. (Thaulow et al., 1987), in a study of microalloyed steels, observed that the structure of all the steels they studied was upper bainite at a cooling rate of $t_{8/5}$=24 seconds ($t_{8/5}$ is the time required to cool from 800° C. to 500° C.).

Granular bainite designates a steel microstructure consisting of a matrix of massive bainitic ferrite containing dispersed martensite-austenite islands (Shouhua et al., 1985). Granular bainite has a higher strength and lower impact toughness than a steel of the same composition but with an equiaxed ferrite-pearlite structure. The Kurdjumov-Sachs relationships exist between the austenite and ferrite phases in granular bainite (Hongsheng et al., 1985). In acicular ferrite, an average grain size of less than 1 micron may be achieved. The high dislocation density found in bainite gives an even greater strength increase than this grain refinement alone (Hulka et al., 1985).

Martensite

Martensite in steel is a metastable transition phase with body centered tetragonal crystal structure formed by diffusionless transformation of austenite at relatively low temperatures. Martensite has been found to fracture on the {100} and {211} cleavage planes, and Martensite-austenite islands are commonly found in weld and HAZ microstructures. These islands act as deformable particles in ductile tearing, but act as nondeformable particles in cleavage of ferrite matrices.

Precipitation

In a study of vanadium microalloyed 0.15% C steels, Bepari (Bepari, 1989) determined that the volume fraction of precipitates and their size or distribution are responsible for ferrite grain size refinement. Recrystallization and grain growth are inhibited by the pinning of austenite grain and subgrain boundaries by fine carbide or carbonitride precipitates. The precipitates formed in steels with multiple microalloying elements are complex, with various compositions and morphologies present in the same steel.

METHODS TO IMPROVE TOUGHNESS IN HPW WELDING

Figure 2A:
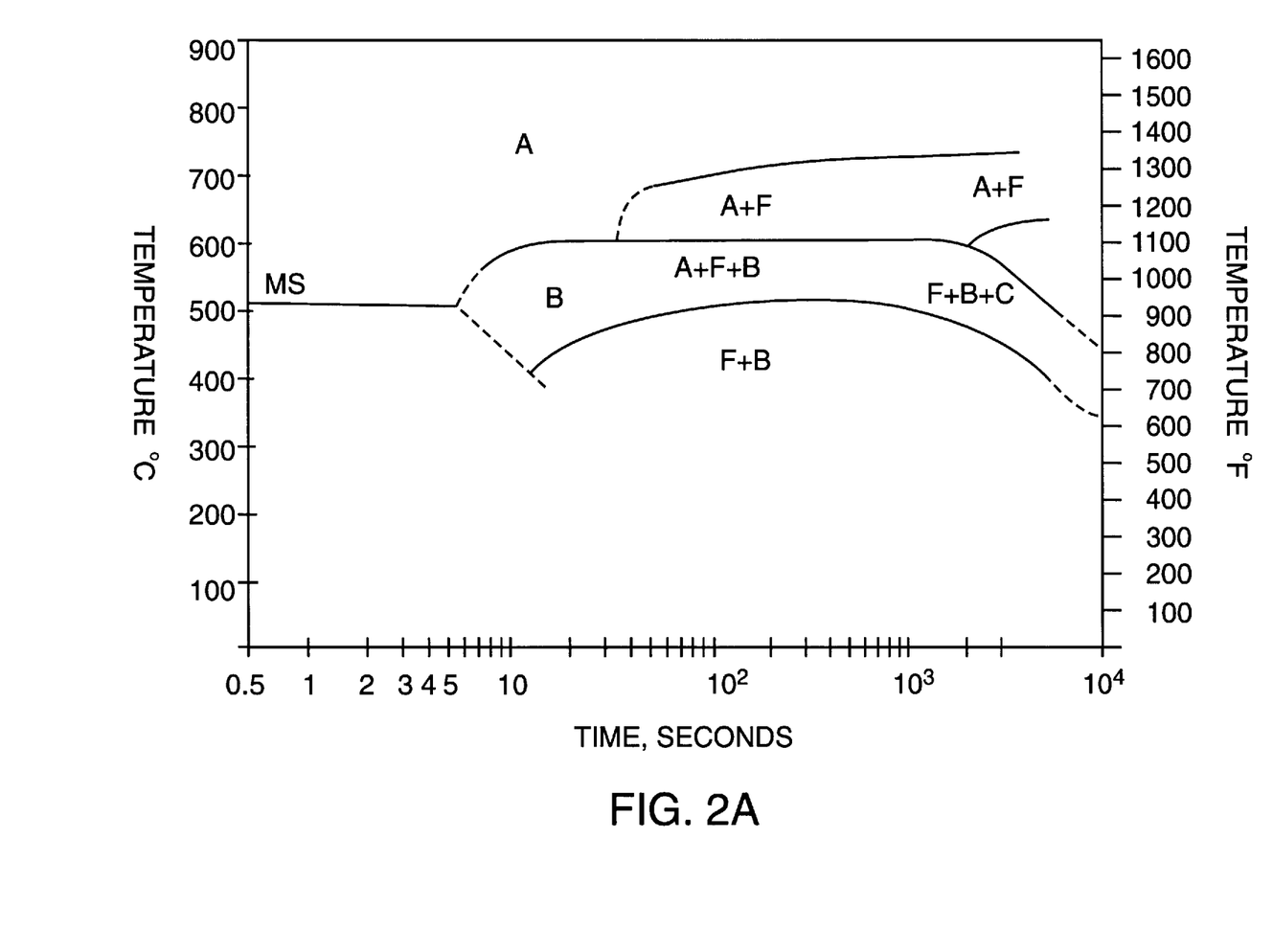
FIG. 2A depicts a continuous Cooling Transformation (CCT) diagram for a low alloy carbon steel likely to be used as a pipeline material, designated as steel A, which is a low carbon, high manganese steel. The composition is 0.06% C—1.95% Mn—0.29% Si—0.003% S—0.010% P—0.010 Mo—0.25% V—0.037% Al—0.008% N Austenitized at 1100° C. (2012° F.) for 6 minutes.
Figure 2B:
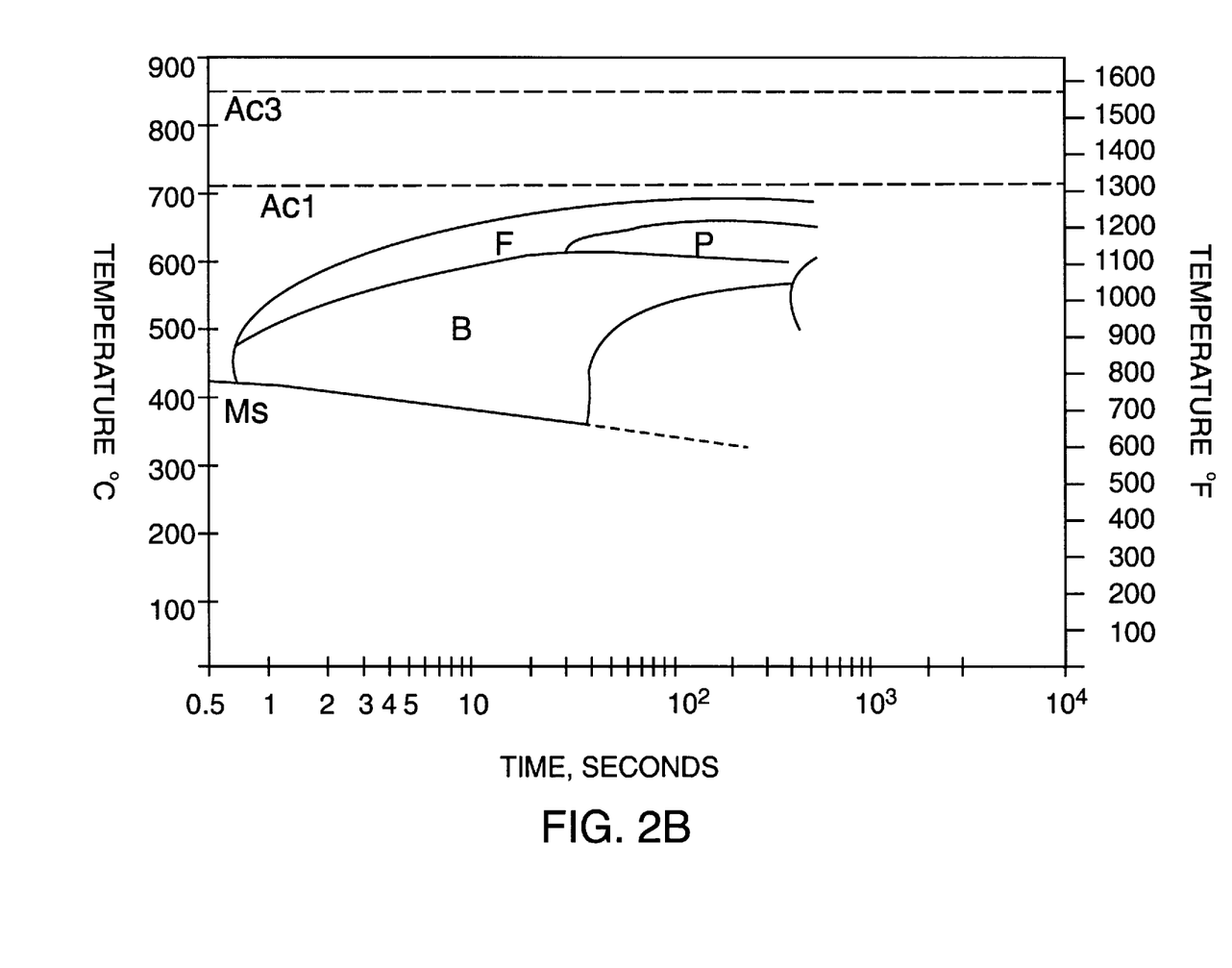
FIG. 2B depicts a continuous Cooling Transformation (CCT) diagram for a low alloy carbon steel likely to be used as a pipeline material, designated as steel B. The composition is 0.15% C—0.9% Mn—0.40% Si—0.05% V—0.014% N; Grain size: ASTM 11.

There are two microstructures potentially achievable in HPW without using filler metals that would lead to optimum impact properties; acicular ferrite and a fine-grained ferrite-pearlite. The choice of which of these microstructures is most easily achieved will be strongly dependent on the chemistry of the pipe being welded. FIG. 2 presents Continuous Cooling Transformation (CCT) diagrams for two low alloy carbon steels likely to be used as pipeline materials, designated as steel A and steel B. The transformation kinetics are greatly effected by the carbon and alloy variations in these steels.

Steels with very low carbon contents and relatively high manganese levels, such as steel A in FIG. 2A, will form an acicular ferrite microstructure upon cooling of austenite at intermediate cooling rates. This steel would have to be cooled at a very slow rate to obtain a ferrite-pearlite microstructure. If this steel were to be homopolar welded, it would be expected that toughness of the weld could be improved by selecting weld parameters so that the weld zone is rapidly cooled, leading to an acicular ferrite structure.

Steels with more moderate carbon content, such as steel B in FIG. 2B, will not form a tough acicular ferrite structure upon cooling from austenite. It is much more likely to achieve a tough microstructure in these steels by slow cooling to form a fine grained ferrite-pearlite structure. It must be remembered, however, that prior austenite grain size has a strong effect on cooling transformations. To achieve a fine grained ferrite-pearlite structure requires that the prior austenite grain size not be large.

In HPW, the interface zone at the weld gets very hot, leading to excessive austenite grain growth. This austenite grain size must be refined before transformation on cooling if a ferrite-pearlite structure is to be expected. The method available for potentially achieving this in HPW is the application of upset, or deformation. It is plausible that if sufficient upset is applied during the weld cooling cycle, the large grained austenite will be deformed enough to either recrystallize into a fine grained austenite or remain as highly deformed austenite with a large surface to volume (Sv) ratio, providing an increased number of ferrite nucleation sites. Even with this austenite grain refinement, it is expected that 800°–500° C. cooling times on the order of a minute or more may be required for transformation to a fully ferrite-pearlite structure.

A ferrite-pearlite structure is also achievable in a homopolar weld if a post weld normalizing treatment is applied. It is possible to normalize the weld zone by applying another homopolar pulse after the weld zone has cooled to below 500° C. This normalizing pulse must have sufficient current density to reheat the weld zone into the austenitizing range without exceeding the grain coarsening temperature and the subsequent cooling rate must be slow enough to produce a ferrite-pearlite microstructure.

The following examples are included to demonstrate preferred embodiments of the invention. It will be appreciated by those of skill in the art that the techniques disclosed in the examples represent techniques discovered pursuant to the invention to function well in the practice of the invention, and thus can be considered to constitute preferred modes for its practice. Those of skill in the art will, however, in light of the present disclosure, appreciate that many changes may be made in the specific embodiments that are disclosed and still obtain a like or similar result without departing from the spirit and scope of the invention.

EXAMPLE I

Circumferentially uniform homopolar pulse welds were readily produced in API 5L X-52 carbon steel linepipe during this study. Tensile strength was found to be strongly dependent on generator discharge parameters and required a nominal upset displacement for full strength welds to be produced. Weld line microstructure and impact toughness were altered by weld process parameter variations. Weld cooling rate was found to be strongly dependent on electrode location. Homopolar pulse normalizing was found to be a viable means of improving the impact toughness of homopolar pulse welds.

WELDING METHODS

A Typical Weld Sequence

A typical weld sequence consisted of the following steps:
Pipe End Preparation

The pipe sections were cut to 4.5 inch lengths (or less if a shorter electrode configuration is used). The pipe ends were lathe turned to provide parallel faces and a 53 microinch root-mean-square finish. The faces were taped for protection and the pipe outer surface was sandblasted and cleaned to provide good contact with the electrodes.
Pipe Sections Mounted in Electrodes The pipe sections were placed in the electrodes and the contact fingers were tightened. FIG. 1 depicts electrode placement and electrode distance on pipe sections used in the present invention. Each electrode was configured as a copper-beryllium sleeve fastened to a copper-beryllium plate that serves as the base. Slots were cut in the sleeve so that the sleeve becomes a concentric ring of fingers. The ends of these fingers were fastened to the pipe via a collar with a series of jackscrews, one for each electrode finger. The sleeve internal diameter away from the fingers was machined so that it was larger than the pipe outer diameter and contact was only at the fingers. An insulating disc was placed between the electrode base and the pipe to prevent electrical contact at these points. An insulating insert was usually placed inside the electrodes to limit allowable platen movement during the upset cycle.
Electrode-Pipe Assembly Mounted in Press The upper electrode-pipe assembly was bolted onto the bottom face of the upper platen of a vertical uniaxial press. The lower electrode-pipe assembly was placed on the lower press platen and the pipe sections are axially aligned. The platens are then adjusted to correct for parallel alignment of the pipe faces. The platens also serve as part of the current path from the generator to the electrodes. In this arrangement, the current flows from the generator through buswork to a platen, from the platen to the electrode base, and then from the electrode fingers to the workpiece.
Initial Contact Pressure and Upset Pressure Set The load controller for the hydraulically actuated press was set for the initial contact load, which is the load that maintains contact pressure between the pipe faces during the weld pulse. At this time, the upset delay and upset load were also set on the controller. The upset delay determines how much time will elapse between the current pulse and application of the upset load (0–10 seconds). The upset load setting determines the upset force or upset pressure.
Generator is Accelerated and Discharged The generator was accelerated to a rotational speed above the discharge speed via hydraulic motors. The motors were disconnected and as the generator was coasting down, the generator was discharged at a predetermined rotational speed. The current pulse traveled through the electrodes and pipe, providing both bulk heating and interface heating at the contacting pipe surfaces. After the preset delay, the upset load was applied by the press to complete the weld.

ASSESSMENT OF WELDS

Tensile Strength

For most of the welds produced, two tensile tests were performed. The tensile specimens were dimensioned as per ASTM A370 alternative strip specimen specification. The specimen width in the two inch gauge length was nominally 0.500 inch, with the weld line centered in the gauge length. Typically, one specimen for each weld was not machined on the inside diameter (ID) and outside diameter (OD) surfaces, leaving the weld lips and pipe curvature intact. The calculated cross sectional area used in determining stress values for these contoured specimens was the product of the measured width and the nominal pipe wall thickness. In the present studies, a 3½ inch nominal OD pipe was generally used.

A flat specimen was typically prepared for each weld by machining the ID and OD surfaces to remove weld lips and curvature. The samples were cut axially so that the direction of pull during the test leaves the weld line at right angles to the direction of pull. The final thickness for these specimens was nominally 0.390 inch. The calculated cross sectional area used in determining stress values for the flat specimens was based on the measured gauge width and thickness.

The tensile tests were performed on an Instron Model 1125 testing frame at a constant crosshead speed of 2 mm/minute. During testing, the load elongation curve was plotted on chart paper with a 100 kN full scale load. Peak load and lower yield point phenomena load (where applicable) were read from the charts after completion of the test. The percent elongation after failure was determined by abutting the specimens after the test and measuring the change in the two inch gauge length.
Impact Toughness Charpy V-notch impact tests were performed on full size specimens dimensioned as per ASTM A370 (10 mm×10 mm×55 mm) specifications. Notches were cut in the specimens with a commercial V-notch cutting machine manufactured specifically for this purpose. All notches on all specimens were cut on the same machine using the same broach. Weld specimens were machined so that the weld line was centered in the specimen. The V-notches were cut on a side of the specimen corresponding to either the inside or outside diameter surfaces of the pipe before machining. The impact tests were performed at room temperature on a Tinius-Olsen impact test machine. Two Charpy specimens were prepared and tested for each weld, except in the cases where it was apparent the bonded weld area was not wide enough to extend completely across a full size Charpy specimen.

Macrostructure

Metallurgical specimens were cut from each weld and mounted in bakelite. After conventional grinding and polishing, the specimens were etched by immersion in a 5% Nital solution. Macrographs were taken at a magnification of 6.6×. These macrographs were used to make comparisons between welds regarding weld contour and shape, extent of heat affected zone and presence or lack of "white line" phenomena.

The condition of the weld edges at ID and OD were recorded with micrographs taken at 100× magnification. For these micrographs, weld specimens were successively ground on 240, 320, 400 and 600 grit silicon carbide paper, rough polished with 6 micron diamond and final polished with 0.05 micron alumina. Etching was performed by immersion in a 2% Nital solution. The base of the edge crack or joint between the two pipe sections at the weld line was photographed through an optical microscope on both the ID and OD sides.

Microstructure

Optical micrographs of the weld zone center of each weld were typically obtained at magnifications of 100× and 200×. The weld specimens were saw cut from the pipe joint and machined flat on an end mill prior to being mounted in bakelite. The mounted specimens were successively ground on 240, 320, 400 and 600 grit silicon carbide paper prior to rough polishing with 6 micron diamond and final polishing with 0.05 micron alumina. Etching was performed by immersion in a 2% Nital solution.

Weld Cooling Temperature

On selected welds, surface temperatures were collected during welding near the weld interface and the resulting weld line. This was done by spot welding Type K thermocouples at selected distances from the weld interface, typically ⅛ and/or ¼ inch. Data were collected on a Yokogawa Hokushin Electric Model 3087-64 Portable Hybrid Recorder, a multichannel strip chart recorder that plotted one data point per channel every 5 seconds. The recorder was started well before discharge of the weld current pulse and collected data until the measured temperatures were well below 500° C.

The timing of the weld current pulse was completely independent of the 5 second data collection rate of the recorder. The weld current discharge could have been initiated at any point between consecutive data points. For this reason there is a 5 second margin of error in relating measured temperatures to the current pulse and this must be considered when comparing data collected from different welds.

EXAMPLE II

Effect of Electrode Gap On Cooling Rate

To determine the effect of electrode location on weld zone cooling characteristics, a series of welds was performed in which the distances from the edge of the electrodes to the weld interface were varied from 0.5 to 2.0 inches. Type K thermocouples were spot welded to the pipe surface at nominal distances of 0.125 and 0.25 inch from the weld interface. As electrode gap was increased, additional thermocouples were added at distances greater than 0.25 inch from the interface. The weld produced with the electrodes 0.5 inch from the interface, weld 423, was upset at 3.0 seconds upset delay; all other welds in this series were not upset, the initial contact pressure was maintained throughout the weld and cool down cycle. As the gap between the electrodes was increased, generator discharge rpm was increased to compensate for the increased bulk resistance between the electrodes. Table 1 presents the welds performed in this series with pertinent weld parameters and thermocouple locations. Electrode gap, as used herein, is the distance between the leading edges of the electrodes. In all cases, the weld interface was centered between the electrodes.

TABLE 1

Welds Performed to Determine the Effect of Electrode Gap on Cooling Rate

| Weld Number | 423 | 424 | 425 | 426 |
|---|---|---|---|---|
| Electrode Gap (inches) | 1.0 | 2.0 | 3.0 | 4.0 |
| Discharge Speed (rmp) | 2800 | 3000 | 3100 | 3228 |
| Peak Current (Ka) | 332 | 337 | 332 | 317 |
| Initial Pressure (ksi) | 3.2 | 3.2 | 3.2 | 3.2 |
| Upset Pressure (ksi) | 20 | 3.2 | 3.2 | 3.2 |
| Upset Delay (seconds) | 3.0 | none | none | none |
| Thermocouple Locations (distance from interface in inches) | 0.125 0.25 | 0.125 0.25 0.5 | 0.125 0.25 0.5 1.0 | 0.125 0.25 0.5 1.0 1.5 |

Temperatures Near Weld Line During Cooling

Figure 3:
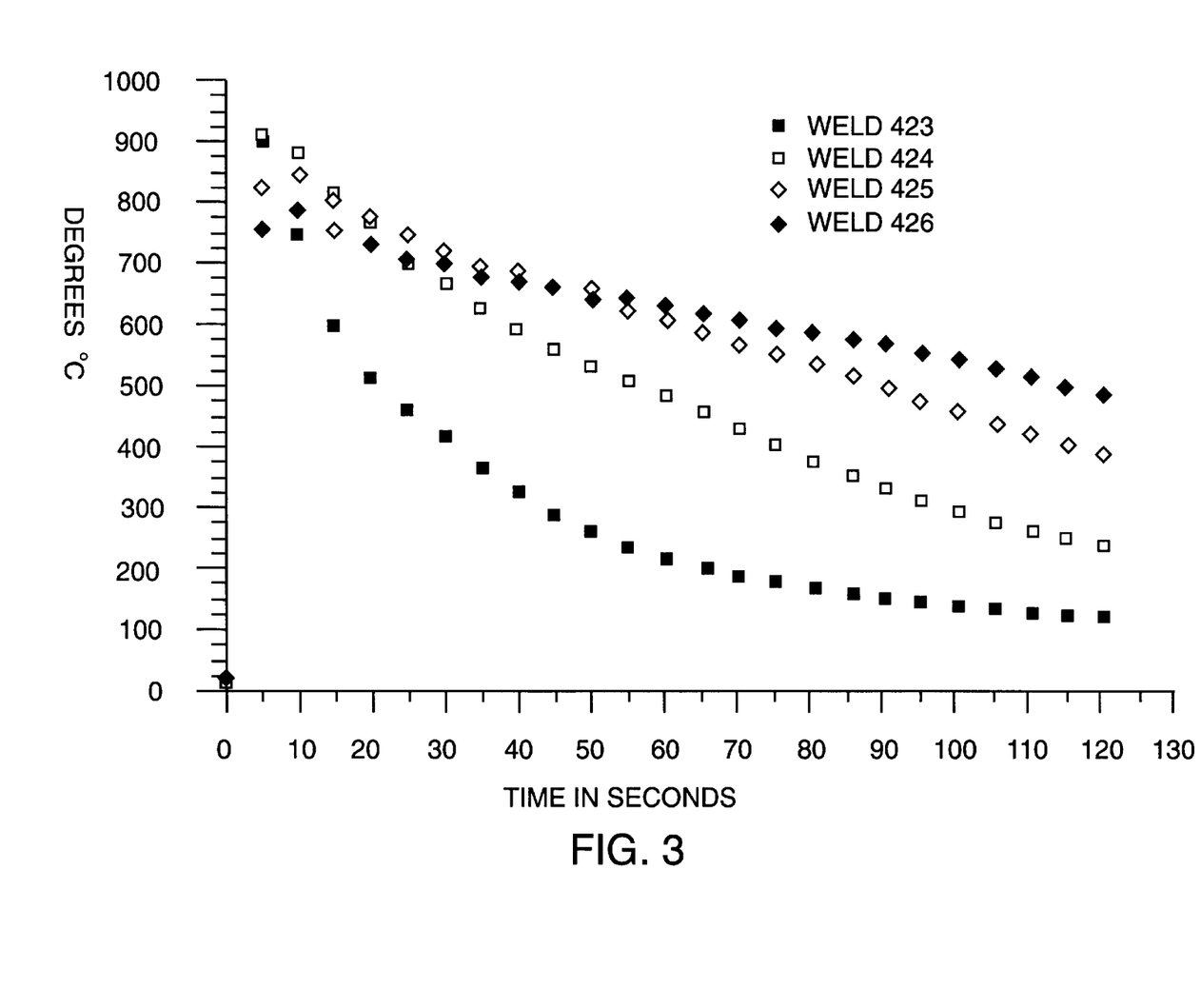
FIG. 3 depicts the cooling curves near the weld interface for various electrode gaps tested with respect to a carbon steel pipe. Weld 423, 1 inch electrode gap; Weld 424, 2 inch electrode gap; Weld 425, 3 inch electrode gap; and Weld 426, 4 inch electrode gap.

FIG. 3 is a plot of temperatures 0.25 inch from the weld line as a function of time after the last ambient reading for a weld. As indicated in FIG. 3 and Table 1, data from welds with one to four inch electrode gaps are included, and show considerable variation in weld heating due to the increased bulk resistance as electrode gap increased. Weld discharge rpm was increased as electrode gap increased to compensate for this resistance, but it can be seen from the FIG. 3 that the weld with the four inch electrode gap did not get as hot as the other welds. Of note is the rate of change of temperature as a function of electrode gap. As may be seen, the rate of change in general increases with decreases in electrode gap.

A commonly used measure of weld zone cooling rate is the time required for the temperature to fall from 800° C. to 500° C. ($t_{8/5}$). Table 2 lists the $t_{8/5}$ for this series of welds at points 0.125 and 0.25 inch from the weld line as a function of electrode gap. As seen in these studies, the electrode location significantly influences weld cooling rate.

TABLE 2

Cooling Times (800°–500° C.) for Welds With Varying Electrode Gaps

| Weld Number | 423 | 424 | 425 | 426 |
|---|---|---|---|---|
| Electrode Gap (inches) | 1.0 | 2.0 | 3.0 | 4.0 |
| $t_{8/5}$ (seconds) 0.125 inch from interface | 13.8 | 41.8 | 71.7 | 92.9 |
| $t_{8/5}$ (seconds) 0.25 inch from interface | 13.0 | 39.2 | 71.7 | 102 |

Temperature Distribution between Electrodes

Figure 4:
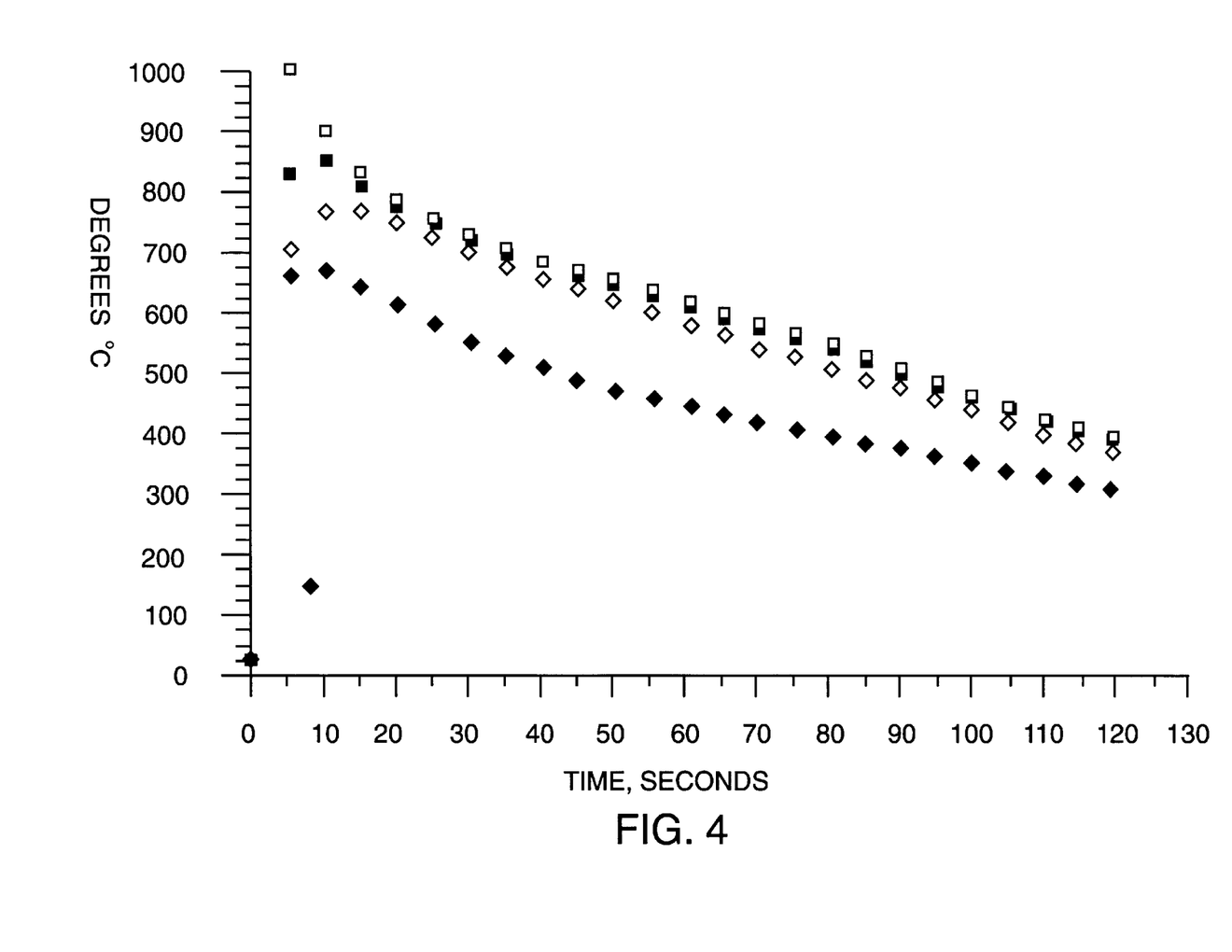
FIG. 4 shows the temperature distribution within a welded pipe section upon cooling with a 3.0 inch electrode gap. Open square; ⅛ inch from weld line; closed square, ¼ inch from weld line; open diamond, ½ inch from weld line; closed diamond; 1 inch from weld line.

With the electrode configuration used in this study, the electrodes remain in contact with the pipe during weld cooling. The beryllium copper electrodes have a high thermal conductivity and act as a heat sink, increasing the weld zone cooling rate. FIG. 4 is a plot of surface temperatures during cool down of weld 425, with a 3.0 inch electrode gap. Surface temperatures are plotted at distances of 0.125, 0.25, 0.5 and 1 inch from the weld interface. These studies show that as distance from the weld line increases, peak temperature decreases and near the electrodes cooling rate increases. One inch from the weld interface equals 0.5 inch from the electrode leading edge in this plot.

EFFECT OF UPSET DELAY—4 INCH ELECTRODE GAP

To evaluate the effects of upset delay on welds with a slower cooling rate, a series of welds were produced with the electrodes mounted 2.0 inches from each side of the weld line. The objective was to determine the influence of upset timing and displacement on weld zone microstructure after upset on welds with a reduced cooling rate.

The discharge rpm for the series of welds was set at 3300 rpm. The initial contact pressure was 3.2 ksi and the upset pressure was set at 12 ksi. This upset pressure was selected, instead of the 20 ksi used previously, so that the total upset would not be excessive, as no upset stop was to be used. The welding parameters and mechanical test results for this series of welds are presented in Table 3. Data from weld 431 is included in this table although this was a non-uniform weld due to a problem with the welding fixture that resulted in overheating and localized melting in one quadrant of the weld interface. Specimens for mechanical testing were taken from sections of the weld outside this quadrant.

TABLE 3

Welds Performed With 4.0 Inch Electrode Gap and Varying Upset Delay

| Weld Number | 427 | 429 | 430 | 431 |
|---|---|---|---|---|
| Upset Delay (seconds) | 3.0 | 9.0 | 1.0 | 6.0 |
| Discharge Speed (rpm) | 3268 | 3284 | 3272 | 3368 |
| Peak Current (kA) | >348 | 318 | 320 | 345 |
| Actual Upset (inches) | 0.260 | 0.096 | 0.321 | 0.148 |
| UTS -Lips (ksi) | 84.7 | 69.6 | 88.2 | 94.5 |
| % Elongation - Lips | 26 | 0 | 27 | 24 |
| UTS - Flat (ksi) | 84.8 | 80.9 | 81.4 | 70 |
| % Elongation - Flat | 27 | 0 | 24 | 0 |
| CVN (ft-lbs) | 32 | 18 | 16 | 34 |
|  | 37 | 22 | 32 | 53 |

Post Normalizing

Postweld normalizing has been recognized as a means to restore impact toughness to homopolar welds, and in these studies, utilization of the homopolar generator itself to normalize the weld zone was investigated. Preliminary furnace normalizing of early homopolar welds was performed to demonstrate that postweld normalizing can improve impact toughness of these welds. Straight sections of pipe were homopolar pulsed in the welding fixture of homopolar pulse normalizing. Following this procedure, homopolar welds were produced between two pipe sections using parameters previously demonstrated to produce a full strength weld joint. Each of these full size homopolar welded pipe sections were then postweld normalized with a single current pulse from the homopolar generator and the microstructure and mechanical properties of the normalized weld joint evaluated.

Preliminary Furnace Normalizing

To demonstrate that postweld normalizing has the potential for improving impact toughness of homopolar welded pipe, a Charpy V-notch impact specimen from an early homopolar weld of the X-52 pipe steel used in this study was furnace normalized and tested. Furnace normalizing was performed by placing the machined specimen in a box furnace at 950° C. for nine minutes, followed by air cooling. Specimen temperature was not monitored during this normalizing treatment, therefore a time at temperature profile is not available. The room temperature Charpy V-notch impact energy of the normalized specimen was 54 ft-lbs, a definite improvement over the as-welded toughness of 7 ft-lbs, but less than the parent metal average impact toughness of 81 ft-lbs.

Straight Pipe Normalizing

Straight sections of pipe, without a weld interface, were pulsed in the welding fixture to determine a suitable discharge rpm for homopolar normalizing. These normalizing tests were done at two electrode gaps, 1.0 and 5.0 inches. Thermocouples were mounted on the surface of the pipe midway between the electrodes and temperature readings were recorded every 5 seconds during cool down and continuously during the first few seconds immediately following initiation of the discharge pulse. The discharge speed was initially set low for a given electrode gap and field current setting, then raised on subsequent pulses until a peak temperature in excess of 800° C. was recorded. The pipe and electrode assembly was allowed to cool below 50° C. between subsequent pulses. A different section of pipe was used for the 5.0 inch electrode gap tests than for the 1.0 inch gap tests, but for a given electrode gap the pipe was not removed from the fixture between subsequent pulses. Table 4 presents discharge speeds, electrode gaps, field currents and peak surface temperatures for these normalizing pulse tests.

TABLE 4

Solid Pipe Normalizing Tests

| Test Number | Electrode (Gap (in) | Field Current (Amp) | Discharge Speed (rpm) | Peak Temperature (°C.) |
|---|---|---|---|---|
| SP 7.1 | 1.0 | 300 | 2012 | 359 |
| SP 7.2 | 1.0 | 300 | 2504 | 605 |
| SP 7.3 | 1.0 | 300 | 2802 | 816 |
| SP 8.1 | 1.0 | 300 | 2810 | 573 |
| SP 8.2 | 1.0 | 300 | 3266 | 811 |
| SP 11.1 | 5.0 | 300 | 1500 | 104 |
| SP 11.2 | 5.0 | 300 | 2000 | 209 |
| SP 11.3 | 5.0 | 300 | 2800 | 449 |
| SP 11.4 | 5.0 | 300 | 3400 | 707 |
| SP 11.5 | 5.0 | 300 | 3700 | 852 |

Straight Pipe Postpulse Cooling

There are two relationships that are evident from Table 4. Decreasing the field current (and hence the magnetic flux cut by the rotor) required an increase in discharge rpm to obtain the same peak surface temperature. Increasing the electrode gap also necessitated an increase in discharge rpm to achieve a comparable peak surface temperature.

Figure 5:
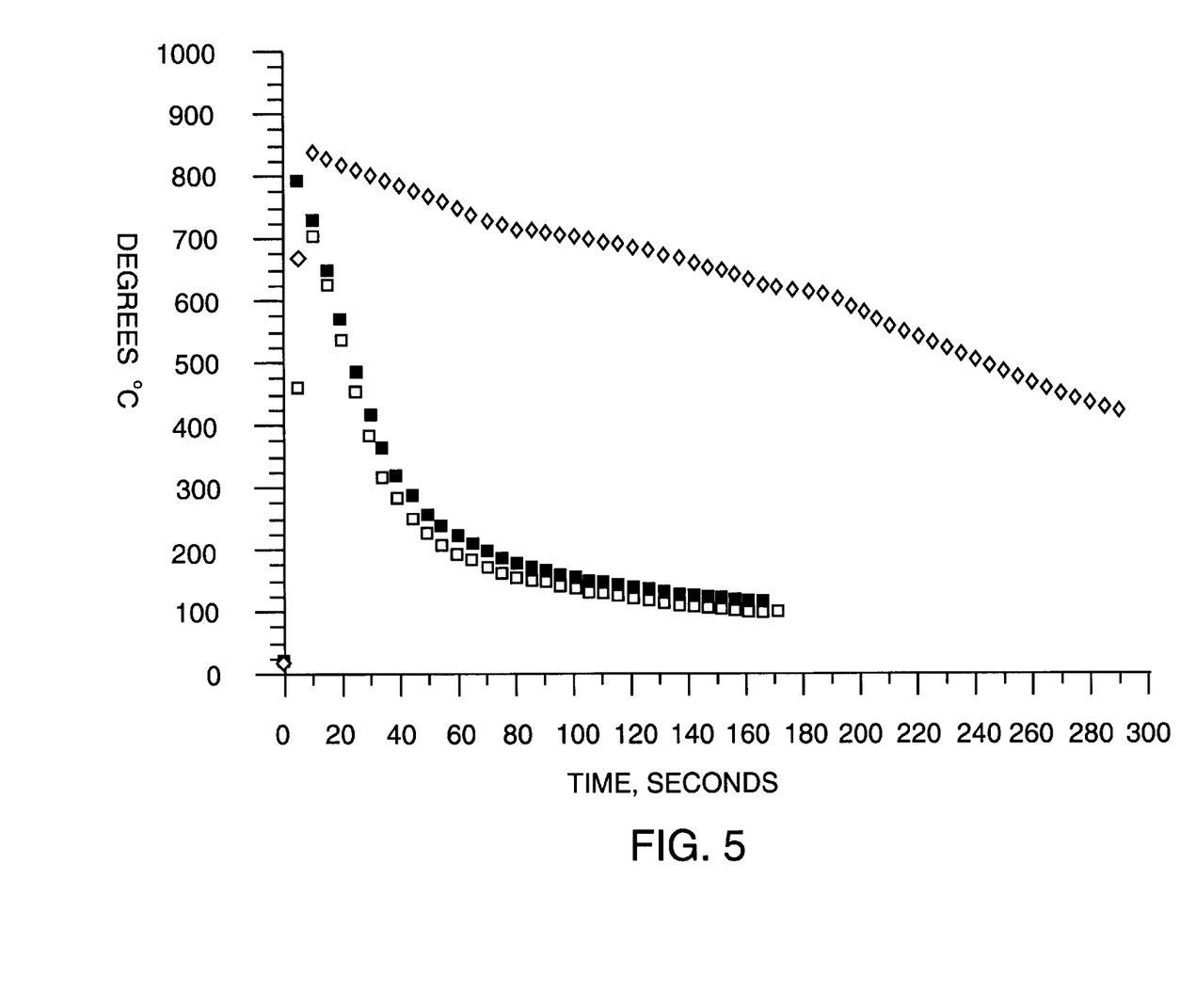
FIG. 5 depicts cooling curves for straight, solid pipe sections. Open square, 1 inch gap with 300 amp field; closed square, 1 inch gap with 200 amp field; open diamond, 5 inch gap with 300 amp field.

The rate at which the pulsed pipe sections cooled was strongly dependent on the electrode gap. FIG. 5 plots postpulse temperature as a function of time for solid pipe tests SP 7.3, SP 8.2 and SP 11.5. The time required for the temperature to fall from 800° C. to 500° C. was on the order of 20 seconds when the electrode gap was 1.0 inch; this time was increased to 200 seconds when the electrode gap was increased to 5.0 inches. It is interesting to note that in the case of the 5.0 inch electrode gap, the temperature plot changes slope between 725° C. and 625° C. on cooling. This may be attributed to cooling transformations occurring in this temperature range.

Pulse Normalized Straight Pipe Microstructure

The microstructure of the 5.0 inch electrode gap pulse normalized straight pipe midway between the electrodes was a grain refined ferrite-pearlite structure. Near the leading edges of the electrodes partial recrystallization was evident, and outside of the electrode leading edges the microstructure was the parent metal ferrite-pearlite.

Mechanical Properties

Impact and tensile specimens from the solid pipe pulsed with the 5.0 inch electrode gap were prepared and tested. Specimens were not prepared from the solid pipe pulsed with the 1.0 inch electrode gap. Impact and tensile values of the pulse normalized pipe were significantly improved over parent metal values, the exception being percent elongation after failure. Table 5 compares the impact and tensile values of the pulse normalized pipe with parent metal values presented earlier.

TABLE 5

Mechanical Properties of X52 Pipe Before and After Homopolar Generator Pulsing

|  | UTS (ksi) | % Elongation | CVN (ft-lbs) |
| --- | --- | --- | --- |
| Parent Metal | 89.1 (flat) | 29 (flat) | 81 average |
|  | 89.7 (contoured) | 32 (contoured) | (8 samples) |
| After Pulsing | 91.6 (flat) | 19 (flat) | 115 average |
| (with 5.0 inch electrode gap) | 93.9 (contoured) | 18 (contoured) | (2 samples at 110 and 120 ft-lbs) |

The improvements in both ultimate tensile strength and impact toughness may be attributed to grain refinement. There was an interesting feature discovered in the tensile tests that must be noted, the parent metal specimens exhibited a lower yield point phenomenon whereas the pulsed specimens did not. This is difficult to explain, perhaps constant loads imposed by the welding fixture introduced sufficient unpinned dislocations to negate the lower yield point phenomenon. This is further complicated by the observation that this lower yield point phenomena was observed in a pulse normalized homopolar weld, to be presented later.

Pulsed Postweld Normalizing

Welds were postweld pulsed in an attempt to improve impact toughness, two with a 1.0 inch electrode gap and one with a 3.0 inch electrode gap. These results are presented in Table 6. An improvement in impact toughness was noted in the case where the 3.0 inch electrode gap was used, although it must also be noted that the postweld pulse heating in cases where the shorter electrode gap was used did not show much effect.

Weld 420 was postweld pulsed with a 1.0 inch electrode gap and weld 423 was postweld pulsed with a 3.0 inch electrode gap. Table 6 shows the weld and postweld pulse parameters and measured values for welds 415, 420 and 423. These welds were all produced with a 3.2 ksi initial contact pressure, 20 ksi upset pressure applied at 3.0 seconds and an 0.0625 inch upset stop.

The peak temperature of 633° C. in weld 420 was considerable lower than the peak temperature of 816° C. recorded in straight pipe pulsing test SP 7.3 (see Table 4), even though the generator discharge speed and field current were the same. This is attributed to the increase in cross sectional area due to displacement bulging at the weld line.

TABLE 6

Weld and Postweld Pulse Parameters of Welds 415, 420 and 423

| Weld Number | 415 | 420 | 423 |
| --- | --- | --- | --- |
| Electrode Gap (inches) | 1.0 | 1.0 | 1.0 |
| Discharge Speed (rpm) | 2788 | 2788 | 2800 |
| Initial Contact Pressure (ksi) | 20 | 20 | 20 |
| Upset Delay (seconds) | 3.0 | 3.0 | 3.0 |
| Postweld Pulsed | No | Yes | Yes |
| Pulse Electrode Gap (inches) | — | 1.0 | 3.0 |
| Pulse Discharge Speed (rpm) | — | 2808 | 3500 |
| Peak Temperature (°C.) (near weld line) | — | 633 | 790 |
| UTS-Contoured (ksi) | 94.6 | 91.0 | 93.9 |
| % Elongation-Contoured | 20.0 | 17.0 | 22.5 |
| UTS-Flat (ksi) | 90.1 | 89.6 | 86.3 |
| % Elongation-Flat | 21.0 | 17.0 | 20.0 |
| CVN Energy (ft-lbs) | 24 | 28 | 45 |
|  | 34 | 34 | 49 |

Mechanical Properties—Weld 423

Tensile specimens from weld 423, postweld pulsed with a 3.0 inch electrode gap, exhibited good ultimate tensile strengths although the flat specimen tensile strength was slightly lower than parent metal values. The contoured specimen from weld 423 failed outside of the weld zone in a ductile fashion, as was typical of welds 415 and 420. The flat tensile specimen from weld 423 failed at the weld line, with one side of the fracture surface being flat, having the appearance of a brittle fracture, and the other side having the typical cup and cone morphology of a ductile fracture.

Of note is that in the load-elongated plots of the weld 423 tensile specimens, the lower yield point phenomenon was present. Tensile tests of the parent metal exhibited lower yield point behavior, but this feature was absent in other homopolar weld tensile tests. Weld 423 had a lower yield point of 70.5 ksi for the contoured specimen and 65.0 ksi for the flat specimen. Parent metal lower yield points were 62.4 ksi for a contoured specimen and 60.5 ksi for a flat specimen.

There was an improvement in Charpy V-notch impact toughness as a result of postweld pulsing weld 423. The impact values of 45 and 49 ft-lbs present the best average impact toughness of any of the homopolar welds tested in this study, with the exception of furnace normalized specimens.

Weld 420, after postweld pulsing, had no improvement in mechanical properties over weld 415, which was not postweld pulsed. Unfortunately the peak temperature achieved in the postweld pulse, 633° C., was much lower than desired and did not have much apparent effect.

Macrostructure

There was bulging at the weld line, consistent with other welds at similar weld parameters. The weld edges were relatively smooth, with the weld line edge crack on the ID side terminating close to the surface.

Postpulse Cooling

Figure 6:
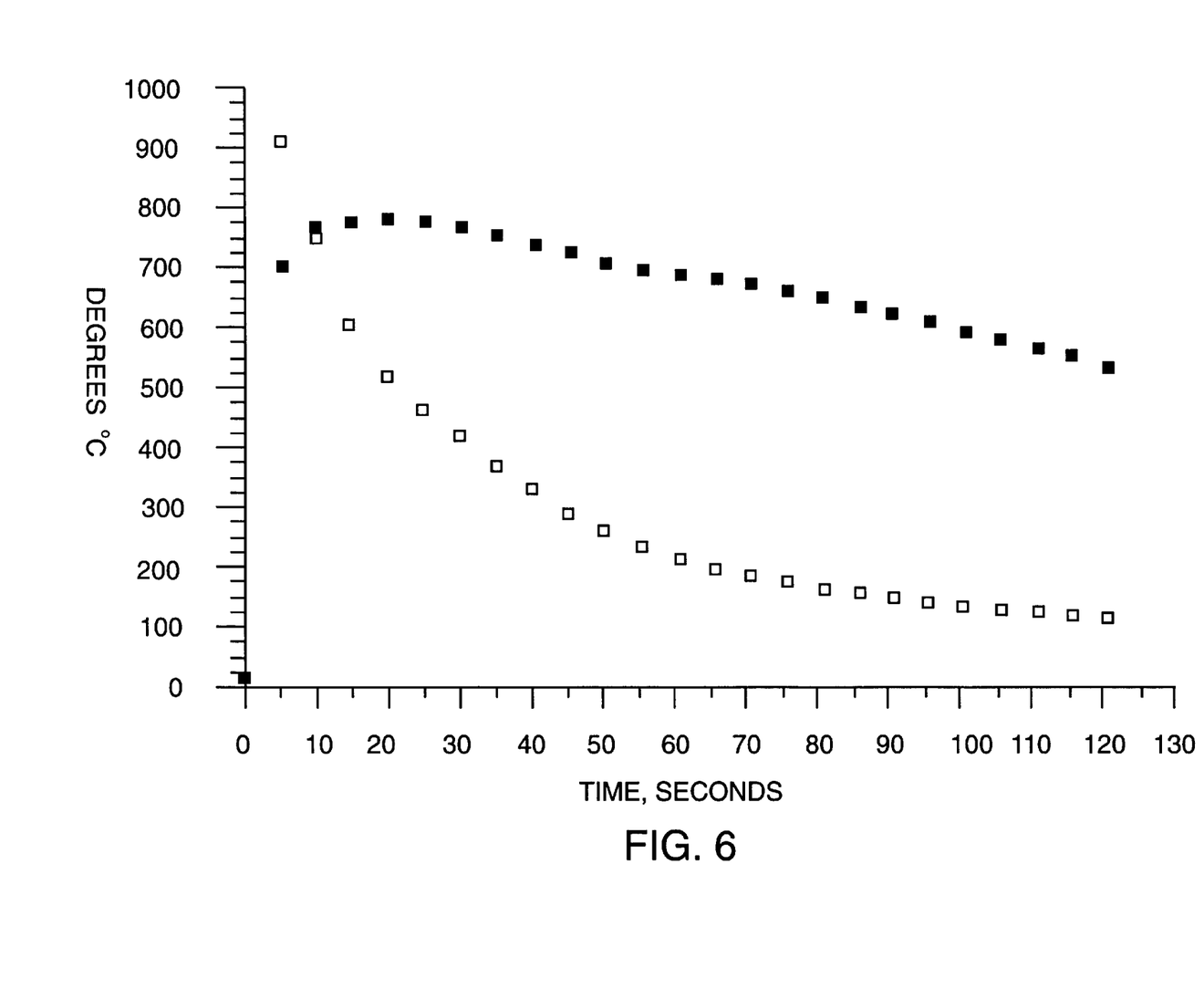
FIG. 6 depicts representative weld and postweld cooling curves measured ¼ inch from a weld line. Open square, weld pulse; closed square, postweld normalizing pulse.

The postweld normalizing pulse applied to weld 423, with a 3.0 inch electrode gap, resulted in a much flatter postpulse cooling curve than the postweld pulses applied with a 1.0 inch electrode gap. The postweld pulse cooling curve for weld 423 was much flatter than the weld cooling curve, although the weld, performed with a 1.0 inch electrode gap, attained a much higher peak temperature. FIG. 6 plots the weld and postweld pulse cooling curves from weld 423 obtained via thermocouples mounted in the pipe outside surface one quarter inch from the original weld interface. The $t_{8/5}$ for the original weld was 13 seconds and the $t_{8/5}$ for the postweld pulse was 112 seconds.

Figure 7:
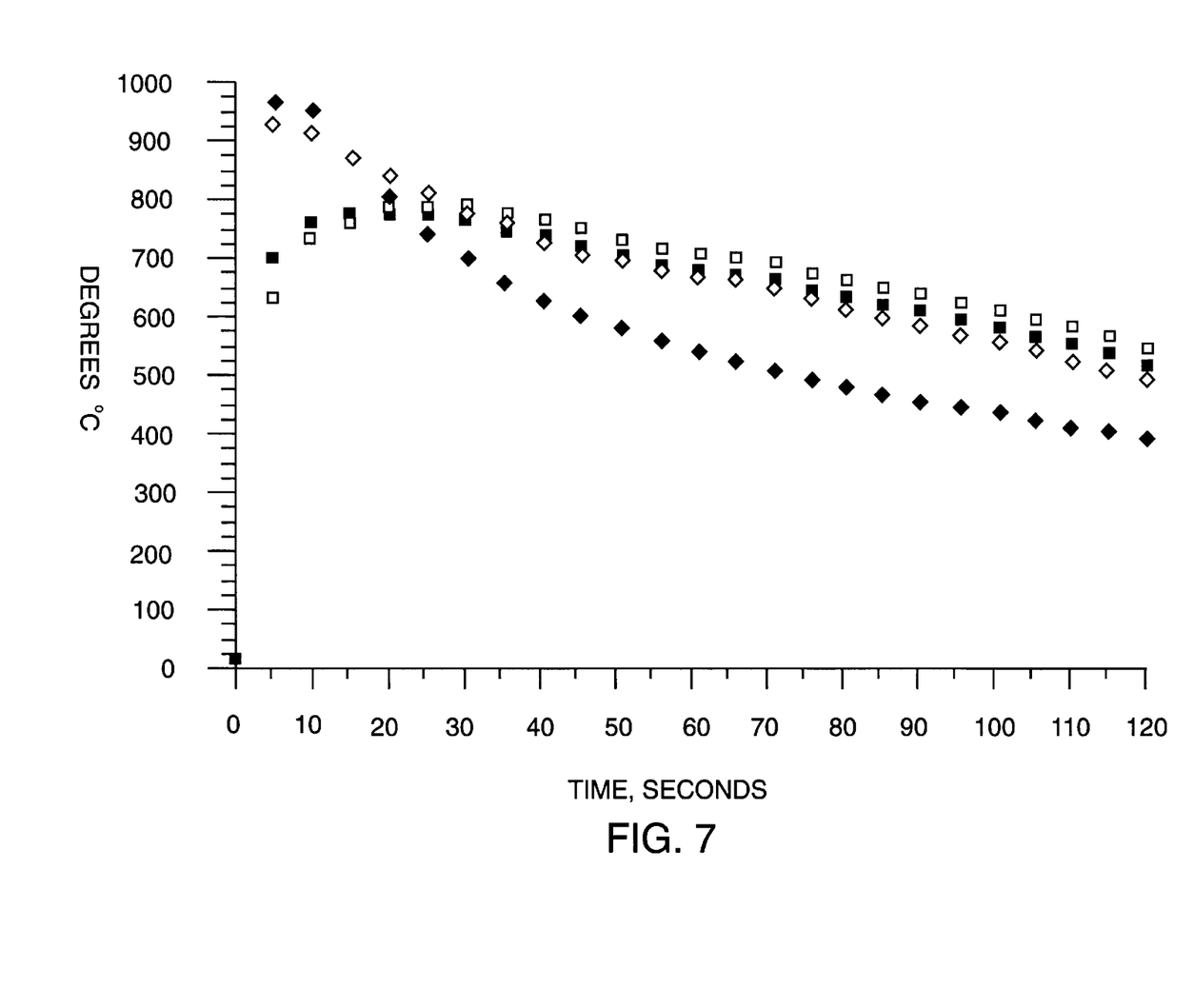
FIG. 7 depicts normalizing pulse cooling curves at various distances from a weld line. Open square; ⅛ inch from weld line; closed square, ¼ inch from weld line; open diamond, ½ inch from weld line; closed diamond; 1 inch from weld line.

The bulging at the weld line was responsible for non uniform heating during the normalizing pulse. The increase in cross sectional area at the weld zone resulted in less resistance heating in the weld zone than the adjacent metal on either side. The cooling rate in the pulsed region, however, increased as the electrodes were approached. These effects resulted in the weld zone being heated to a lower peak temperature but cooled at a slower rate than adjacent areas. FIG. 7 plots the postpulse cooling temperatures, obtained via surface thermocouples various distances from the original weld line, for the weld 423 normalizing pulse.

Rockwell Hardness of Weld 423

Figure 8:
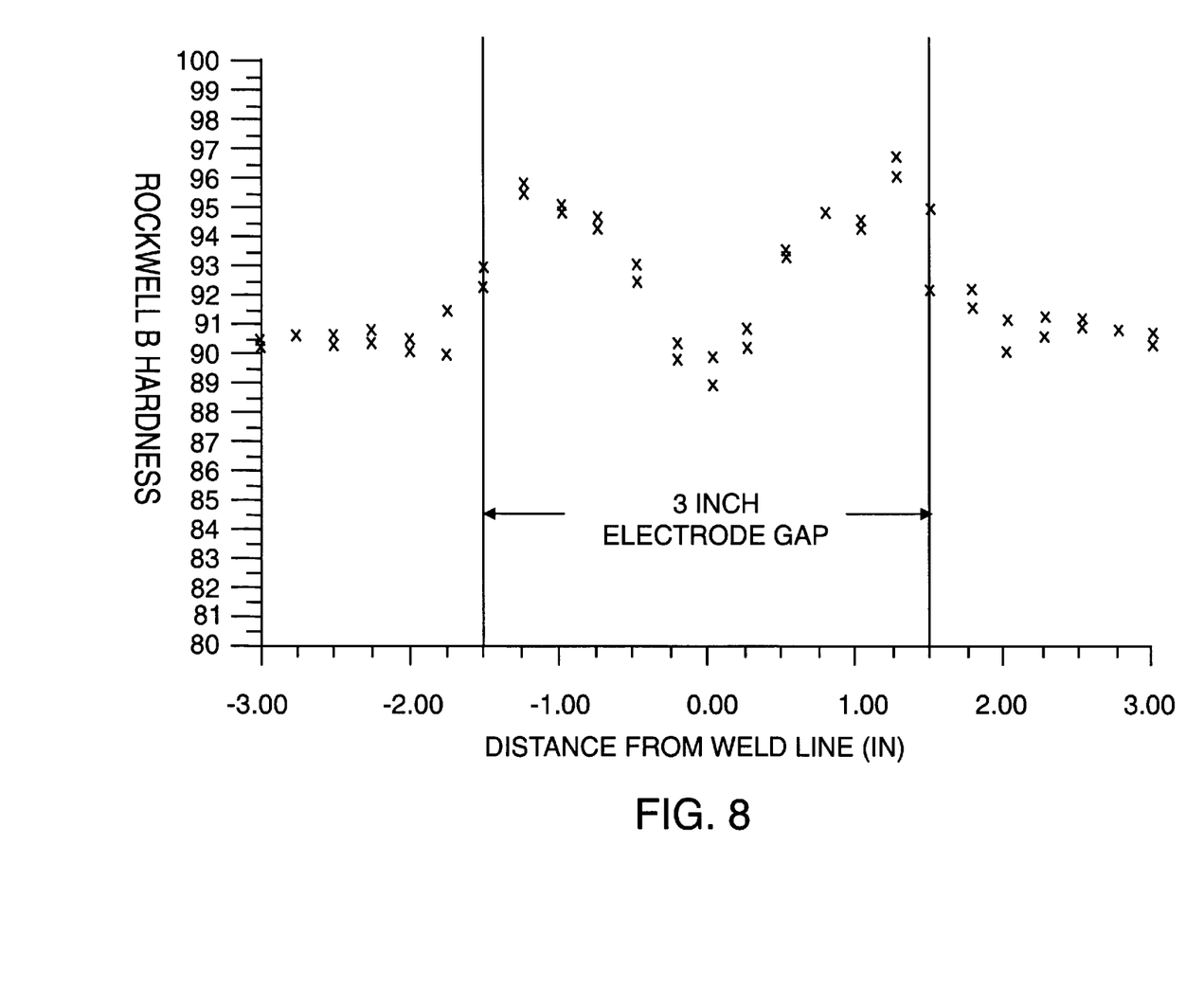
FIG. 8 depicts Rockwell B hardness measurements taken at the weld line and every quarter inch from the weld line to a distance of three inches on both sides of the weld line.

A hardness traverse using the Rockwell B scale was obtained from a specimen cut from weld 423. The specimen was cut as a longitudinal strip and included material extending past the electrode locations on both sides. This specimen was machined on both cut sides to provide a flat surface. One side was then ground on successively finer silicon carbide grinding paper to 600 grit. Two Rockwell B hardness measurements were taken on this surface at the weld line and every quarter inch from the weld line to a distance of three inches on both sides of the weld line. The results of this hardness traverse are plotted in FIG. 8. Peak hardness values are found beginning just within the electrode locations, 1.5 inches on either side of the weld line. These areas are also those that would likely have experienced the fastest cooling rates following the normalizing pulse.

Electrode Location

The size of the gap between the electrodes had a large impact on post pulse cooling characteristics, with cooling rate on the pipe surface midway between the electrodes decreasing with increasing electrode gap. In welds, increasing the electrode gap from 1.0 to 4.0 inches resulted in the $t_{8/5}$ increasing from 13 to 102 seconds. Similar results were found in postpulse cooling of solid pipe sections, where increasing the electrode gap from 1.0 to 5.0 seconds increased the $t_{8/5}$ from 20 to 200 seconds.

Increasing the electrode gap increases the resistance between the electrodes, requiring an increase in generator discharge rpm to achieve the same pulse peak current. The increased mass of pipe between the electrodes leads to a higher proportion of the pulse energy being required for bulk heating. The increase in mass being heated is one of the factors contributing to reduction in the cooling rate. One other factor is the electrodes themselves, they have high thermal conductivity and act as a heat sink. Increasing the electrode gap lengthens the conduction path through the lower conductivity steel pipe.

The cooling rate could be slowed even further by removing the electrodes after the current pulse. This may be an option in an industrial welding fixture, where the electrodes are pneumatically or hydraulically actuated. The cooling rate may be expected to be somewhat dependent on design and constructional features of the welding fixture and electrode assembly along with dimensional factors, such as pipe wall thickness, and these should be evaluated in the design process.

Work on the invention has demonstrated that cooling rate may be varied an order of magnitude simply by changing the spacing between the electrodes. This may be a very effective tool in controlling the cooling rate following welding and/or postweld pulse normalizing. The optimum cooling rate will likely be dependent on the specific alloy chemistry of the pipe being welded.

Homopolar Pulse Normalizing

Postweld pulse normalizing was performed using an electrode gap of 3.0 inches. The measured surface temperature at the weld line during the normalizing pulse peaked at 790° C., lower than the expected optimum range of 900°–950° C. While the weld zone heating was low, the impact toughness values of the two Charpy V-notch specimens cut from this weld were 45 and 49 ft-lbs; an improvement over previous as-welded specimens.

Electrode gap spacing may be adjusted prior to postweld pulsing to provide a desired cooling rate in the weld zone. In the solid pipe pulsing tests performed as part of the present study, pulsing to comparable peak temperatures resulted in a $t_{8/5}$ of about 20 seconds for a 1.0 inch electrode gap and a $t_{8/5}$ of 200 seconds for a 5.0 inch electrode gap. The postweld pulsed weld with an electrode gap of 3.0 inches had a $t_{8/5}$ of 112 seconds.

The cooling rate increases closer to the electrodes due to the high thermal conductivity of the electrodes. Such cooling may be reduced by removing the electrodes from the pipe surface after completion of the current pulse. In the event that a rapid cooling rate is desired, such as to produce an acicular ferrite structure in a steel of suitable chemistry, the electrode gap may be shortened and the electrodes left in contact with the pipe surface to accelerate cooling.

Electrode distance from the weld interface serves to control the weld cooling rate. In the present invention, it was determined that changing the distance between the electrode and weld interface from about 0.5 inch to about 2.0 inches resulted in the $t_{8/5}$ increasing from about 13 to about 102 seconds. There are two likely reasons for this. First, increasing the electrode gap results in a larger portion of the pipe on each side of the weld line experiencing bulk resistive heating (increased heat input). Second, moving the high thermal conductivity copper alloy electrodes away from the interface also increases the conduction path length through the lower conductivity steel, resulting in a reduced thermal gradient at the weld.

It was found that substantial alterations in the microstructure at the weld line may be obtained by varying process parameters. Delaying upset resulted in elimination of the "white line," which is a thin ferrite band at the weld line. Increasing the upset displacement had the apparent effect of refining the bainitic microstructure in welds with an about 1.0 inch electrode gap. Increasing electrode gap to about 4.0 inches reduced the proportion of bainite and increased the proportion of proeutectoid ferrite in the microstructure.

Homopolar pulse normalizing is a viable means of improving the impact toughness of the steel studied. Pulse normalizing straight pipe sections was demonstrated to refine the parent metal microstructure and substantially increase the impact toughness. Pulse normalizing a weld under optimum conditions may result in the weld having significantly greater impact toughness than the parent metal.

The apparatus and methods disclosed and claimed herein may be made and executed without undue experimentation in light of the present disclosure. While the apparatus and methods of this invention have been described in terms of preferred embodiments, it will be apparent to those of skill in the art that variations may be applied to the apparatus, methods and in the steps or in the sequence of steps of the method described herein without departing from the concept, spirit and scope of the invention. All substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Bepari, "Effects of precipates on ferrite grain size in 0.15% C steels", *Materials Science and Technology*, 5:13–19, 1989.

DiMicco and Davenport, "Austenite Recrystallization and Grain Growth During the Hot Rolling of Microalloyed Steels", *Thermomechanical Processing of Microalloyed Austenite*, The Metallurgical Society of AIME, pp. 59–81, 1982.

Fairchild, "Local Brittle Zones in Structural Welds", *Welding Metallurgy of Structural Steels*, edited by Jay Koo, The Metallurgical Society, pp. 303–318, 1987.

Faulkner, "Influence of phosphorus on weld heat affected zone toughness in niobium microalloyed steels", *Materials Science and Technology*, 5:1095–1101, 1989.

Honeycombe, "Carbide Precipitation in Ferrite", *Phase Transformations in Ferrous Alloys*, edited by A. R. Marder and J. I. Goldstein, The Metallurgical Society of AIME, pp. 259–280, 1983.

Hongsheng et al., "The Formation and Morphology of Granular Bainite and Granular Structure", *HSLA Steels: Metallurgy and Applications, Proc. of Int. Conf. on HSLA Steels*, pp. 359–367, Beijing, China, 1985.

Hulka et al., "High Strength Pipeline Steels for Arctic and Sour Environment Processed Under Non-severe Rolling Conditions", *HSLA Steels: Metallurgy and Applications, Proc. of Int. Conf. on HSLA Steels*, pp. 475–484, Beijing, China, 1985.

Kirkwood, "A Viewpoint on the Weldability of Modern Structural Steels", *Welding Metallurgy of Structural Steels*, edited by Jay Koo, the Metallurgical Society, pp. 21–44, 1987.

Lagneborg et al., "Microalloyed Ferrite-Pearlite Forging Steels with Improved Toughness", *HSLA Steels: Metallurgy and Applications, Proc. of Int. Conf. on HSLA Steels*, pp. 863–873, Beijing, China, 1985.

Ridley, "The Pearlite Transformation", *Phase Transformations in Ferrous Alloys*, edited by A. R. Marder and J. I. Goldstein, The Metallurgical Society of AIME, pp. 201–236, 1983.

Samuels, "Optical Microscopy of Carbon Steels", *American Society for Metals*, Metals Park, Ohio, p. 36, 1980.

Shouhua et al., "Deformation and Fracture of a Microalloyed 12SiMoVNb Steel with Granular Bainite Structure", *HSLA Steels: Metallurgy and Applications, Proc. of Int. Conf. on HSLA Steels*, pp. 113–120, Beijing, China, 1985.

Thaulow et al., "The Heat-Affected Zone Toughness of Low-Carbon Microalloyed Steels", *Welding Journal*, ____:266s–279s, 1987.

What is claimed is:

1. A method for determining a cooling rate for metal alloy pipe in a homopolar pulse welding system, comprising:

contacting the ends of a first pipe and a second pipe of a first pair of pipes to form a weld interface;

mounting a first electrode on said first pipe and a second electrode on said second pipe;

mounting at least one thermoelectric transducer on each pipe proximate said interface;

resistively heating said weld interface by discharging sufficient energy from a homopolar generator through said electrodes and said electrode gap to form a welded pipe segment; and measuring the temperature of said welded pipe segment as indicated by said transducers at periodic time intervals following such discharge to determine a cooling rate for said welded pipe segment.

2. The method according to claim 1, wherein the first and second electrodes of a second pair of pipes are moved relative to the positions of said first pair of electrodes and their respective weld interfaces to change the cooling rate of a weld of the second pair of pipes relative to the cooling rate of a weld of said first pair of pipes.

3. The method according to claim 1, wherein the thermoelectric transducers are thermocouples.

4. A method for controlling the cooling rate of metal alloy pipe in an electrical resistance welding process in a homopolar welding system, comprising:

positioning an end of a first said pipe and an end of a second said pipe to form a weld interface;

mounting a first movable electrode on said first pipe and a movable second electrode on said second pipe, such that a distance between said first electrode and said second electrode defines an electrode gap;

adjusting said electrode gap by moving said electrodes relative to one another to provide a selected cooling rate;

resistively heating said weld interface by discharging energy from a homopolar generator through said electrodes and said electrode gap to weld said first and second pipes at said weld interface to form a welded pipe segment; and allowing said welded pipe segment to cool.

5. The method according to claim 4, wherein the ends of a first pipe and a second pipe are prepared for electrical resistance welding in a homopolar welding system.

6. A method of welding two sections of pipe end-to-end which comprises:

resistance welding a plurality of sets of two opposing ends of pipe sections at an elevated welding temperature;

cooling the sets at different rates; and analyzing the resulting welds for one or more metallurgical properties to provide cooling parameters correlating cooling rate with each such property.

7. The method according to claim 6, in which the electrodes supplying the welding current to the pipe sections are spaced from each other at different electrode gaps to vary the cooling rate.

8. A system for homopolar pulse welding sections of a given pipe end-to-end, which comprises:

(a) positioning the electrodes of a homopolar pulse generator on two sections of the given pipe proximate ends of the sections to be welded together, said electrodes defining an electrode gap spanning said ends;

(b) homopolar pulsing the electrodes with sufficient energy to weld the ends of the sections;

(c) measuring the rate of cooling of the resulting weld;

(d) repeating steps (a)–(c) for different pairs of sections of said pipe and for different said electrode gaps; and (e) analyzing the resulting welds for one or more metallurgical properties to provide cooling parameters correlating said cooling rates with each said property.

9. The method according to claim 8, which further comprises applying a sufficient homopolar pulse to the weld at a weld temperature less than about 500° C. to reheat the weld to a temperature sufficient to promote growth of austenite crystals but not coarser grains; and thereafter cooling the reheated weld at a rate sufficiently slow to produce a ferrite-pearlite structure in the weld.

10. The method according to claim 8, wherein the electrode gap of the electrodes employed in the homopolar pulses is increased to slow the cooling rate of the weld or decreased to increase the cooling rate of the weld, as necessary.

11. A method of increasing a ferrite-pearlite structure in a steel pipe weld which comprises:

homopolar pulse welding the opposing ends of two lengths of pipe to form a welded pipe joint containing austenite grains; and applying sufficient upset to the welded joint during cooling of the joint to reform the austenite grains or reduce their grain size.

12. The method of claim 11, in which the welded joint is heated to a temperature of at least 800° C. during said welding.

13. The method of claim 11 in which the weld is cooled from about 800° C. to about 500° C. over a period of at least about a minute.

14. A method of controlling the cooling rate of a metal pipe weld produced by homopolar pulse welding employing electrodes connected to the pipe which comprises increasing the electrode distance from the weld interface to decrease the cooling rate, and decreasing the electrode distance from the weld interface to increase the cooling rate.

15. An apparatus for welding two sections of pipe end-to-end comprising:

hydraulically actuated mounting members to support the pipe sections end-to-end at a weld interface and actuable to press the ends together at different pressures;

a first electrode attachable to a first said pipe section in axially adjustable relation with the first said pipe section;

a second electrode attachable to a second said pipe section and in axially adjustable relation with the second said pipe section; and a homopolar pulse generator connected to said electrodes and operable to supply sufficient energy to the electrodes to weld the pipe sections at said interface to form a welded pipe segment.

16. The apparatus according to claim 15, which further comprises a temperature sensor operable to measure the temperature at a selected position on a said pipe section between its said electrode and said interface.

17. The apparatus according to claim 16, which further comprises a reference member correlating metallurgical parameters of a weld for a given pipe with positions of the electrodes relative to the weld interface, the energy supplied by the homopolar pulse generator, and temperatures indicated by the temperature sensor as the weld cools following its formation.

18. A method of controlling a metallurgical parameter of a weld joining two pipe sections end-to-end by homopolar pulse welding in which energy is transmitted to the pipe sections through electrodes attached to the pipe sections, said method comprising:

homopolar pulse welding a sufficient plurality of pairs of pipe sections of a given pipe at different welding energies, electrode gaps, and weld cooling rates;

analyzing the resulting welds for the values of a given metallurgical parameter;

correlating said values with said energies, electrode gaps and cooling rates; and controlling the value of said parameter for a said weld of a particular pair of said given pipes in accordance with such a correlation.

* * * * *